(12) United States Patent
Soubrie (10) Patent No.: US 8,896,549 B2
(45) Date of Patent: Nov. 25, 2014

(54) METHOD AND SYSTEM FOR DUPLICATING AN OBJECT USING A TOUCH-SENSITIVE DISPLAY

(75) Inventor: Cedric Soubrie, Paris (FR)

(73) Assignee: Dassault Systemes, Velizy Villacoublay (FR)

( * ) Notice: Subject to any disclaimer, the term of this patent is extended or adjusted under 35 U.S.C. 154(b) by 176 days.

(21) Appl. No.: 12/958,703

(22) Filed: Dec. 2, 2010

(65) Prior Publication Data

US 2011/0141043 A1 Jun. 16, 2011

(30) Foreign Application Priority Data

Dec. 11, 2009 (EP) ..................................... 09306214

(51) Int. Cl.
*G06F 3/041* (2006.01)
*G06F 3/0488* (2013.01)

(52) U.S. Cl.
CPC .. *G06F 3/04883* (2013.01); *G06F 2203/04808* (2013.01)
USPC .......................................... 345/173; 345/419

(58) Field of Classification Search
CPC ................... G06F 2203/04808; G06F 3/04883
USPC ............. 345/156–173, 419; 178/18.01–18.09
See application file for complete search history.

(56) References Cited

U.S. PATENT DOCUMENTS

| | | | | |
|---|---|---|---|---|
| 5,511,148 A | * | 4/1996 | Wellner .......................... | 358/1.6 |
| 5,732,227 A | * | 3/1998 | Kuzunuki et al. ............. | 715/775 |
| 5,917,490 A | * | 6/1999 | Kuzunuki et al. ............. | 715/775 |
| 6,067,112 A | * | 5/2000 | Wellner et al. .............. | 348/211.4 |
| 6,266,057 B1 | * | 7/2001 | Kuzunuki et al. ............. | 715/745 |
| 6,331,840 B1 | * | 12/2001 | Nielson et al. .................. | 345/1.1 |
| 6,545,669 B1 | * | 4/2003 | Kinawi et al. .................. | 345/173 |
| 6,570,557 B1 | * | 5/2003 | Westerman et al. .......... | 345/173 |
| 6,670,894 B2 | * | 12/2003 | Mehring ......................... | 341/22 |
| 6,677,932 B1 | * | 1/2004 | Westerman .................... | 345/173 |
| 7,030,861 B1 | * | 4/2006 | Westerman et al. .......... | 345/173 |
| 7,139,445 B2 | * | 11/2006 | Pilu et al. ...................... | 382/313 |

(Continued)

FOREIGN PATENT DOCUMENTS

| | | |
|---|---|---|
| EP | 0 622 722 | 11/1994 |
| JP | 2011123896 A * | 6/2011 |

OTHER PUBLICATIONS

Wayne Westerman, Hand Tracking Finger Identification, and Chordic Manipulation on a multi-touch surface, Spring 1999, Ph.D disseration University of Delaware, pp. 1-333.*
European Search Report from EP 09 30 6214 dated May 27, 2010.*

*Primary Examiner* — Quan-Zhen Wang
*Assistant Examiner* — Chun-Nan Lin
(74) *Attorney, Agent, or Firm* — Hamilton, Brook, Smith & Reynolds, P.C.

(57) ABSTRACT

The invention is directed to a computer-implemented method and system for duplicating an object using a touch-sensitive display. The method comprises: (i) displaying a selected first object on the touch-sensitive display; (ii) detecting a first user interaction and a second user interaction on the selected first object; (iii) detecting a movement of the first user interaction outside the selected first object; (iv) displaying a second object which tracks the movement of the first user interaction on the touch-sensitive display, the second object being a duplication of the first object; and (v) positioning the second object according to a last detected location of the first user interaction on the touch-sensitive display.

10 Claims, 4 Drawing Sheets

(56) References Cited

U.S. PATENT DOCUMENTS

| | | | |
|---|---|---|---|
| 7,185,291 B2* | 2/2007 | Wu et al. | 715/863 |
| 7,339,580 B2* | 3/2008 | Westerman et al. | 345/173 |
| 7,620,901 B2* | 11/2009 | Carpenter et al. | 715/754 |
| 7,653,883 B2* | 1/2010 | Hotelling et al. | 715/863 |
| 7,663,607 B2* | 2/2010 | Hotelling et al. | 345/173 |
| 7,705,830 B2* | 4/2010 | Westerman et al. | 345/173 |
| 7,743,348 B2* | 6/2010 | Robbins et al. | 715/863 |
| 7,777,732 B2* | 8/2010 | Herz et al. | 345/173 |
| 7,812,828 B2* | 10/2010 | Westerman et al. | 345/173 |
| 7,840,912 B2* | 11/2010 | Elias et al. | 715/863 |
| 7,924,271 B2* | 4/2011 | Christie et al. | 345/173 |
| 8,059,101 B2* | 11/2011 | Westerman et al. | 345/173 |
| 8,130,205 B2* | 3/2012 | Forstall et al. | 345/173 |
| 8,201,109 B2* | 6/2012 | Van Os et al. | 715/863 |
| 8,239,784 B2* | 8/2012 | Hotelling et al. | 715/830 |
| 8,266,529 B2* | 9/2012 | Ooi et al. | 715/702 |
| 8,269,736 B2* | 9/2012 | Wilairat | 345/173 |
| 2002/0196238 A1* | 12/2002 | Tsukada et al. | 345/173 |
| 2004/0150668 A1* | 8/2004 | Myers et al. | 345/771 |
| 2005/0057524 A1* | 3/2005 | Hill et al. | 345/173 |
| 2006/0026521 A1* | 2/2006 | Hotelling et al. | 715/702 |
| 2006/0125803 A1* | 6/2006 | Westerman et al. | 345/173 |
| 2007/0112832 A1* | 5/2007 | Wong et al. | 707/102 |
| 2007/0177804 A1* | 8/2007 | Elias et al. | 382/188 |
| 2008/0005703 A1* | 1/2008 | Radivojevic et al. | 715/863 |
| 2008/0158170 A1* | 7/2008 | Herz et al. | 345/173 |
| 2008/0163130 A1* | 7/2008 | Westerman | 715/863 |
| 2008/0165140 A1* | 7/2008 | Christie et al. | 345/173 |
| 2008/0297482 A1* | 12/2008 | Weiss | 345/173 |
| 2009/0079700 A1* | 3/2009 | Abernathy | 345/173 |
| 2009/0307589 A1* | 12/2009 | Inose et al. | 715/702 |
| 2009/0327975 A1* | 12/2009 | Stedman | 715/863 |
| 2010/0017734 A1* | 1/2010 | Cummins et al. | 715/769 |
| 2010/0031202 A1* | 2/2010 | Morris et al. | 715/863 |
| 2010/0031203 A1* | 2/2010 | Morris et al. | 715/863 |
| 2010/0050076 A1* | 2/2010 | Roth | 715/702 |
| 2010/0070900 A1* | 3/2010 | Cummins et al. | 715/769 |
| 2010/0090971 A1* | 4/2010 | Choi et al. | 345/173 |
| 2010/0115455 A1* | 5/2010 | Kim | 715/781 |
| 2011/0029927 A1* | 2/2011 | Lietzke et al. | 715/835 |
| 2011/0038552 A1* | 2/2011 | Lam | 382/232 |
| 2011/0055773 A1* | 3/2011 | Agarawala et al. | 715/863 |
| 2011/0090155 A1* | 4/2011 | Caskey et al. | 345/173 |
| 2011/0141043 A1* | 6/2011 | Soubrie | 345/173 |
| 2011/0169763 A1* | 7/2011 | Westerman et al. | 345/173 |
| 2011/0175837 A1* | 7/2011 | Westerman et al. | 345/173 |
| 2011/0209103 A1* | 8/2011 | Hinckley et al. | 715/863 |

\* cited by examiner

METHOD AND SYSTEM FOR DUPLICATING AN OBJECT USING A TOUCH-SENSITIVE DISPLAY

RELATED APPLICATION(S)

This application claims priority under 35 U.S.C. §119 or 365 to European, Application No. 09306214.9, filed Dec. 11, 2009.

The entire teachings of the above application(s) are incorporated herein by reference.

FIELD OF THE INVENTION

The invention relates generally to the field of computer programs and systems, and more specifically to a method for duplicating an object using a touch-sensitive display.

BACKGROUND

In the field of computers, the graphical user interface (GUI) plays an important role as regards the efficiency of the interactions between a user and a device such as for example personal computer, laptop, music player, cell phone, personal digital assistants. These devices execute various applications and programs which perform functions.

Usually, the user interacts with the applications and programs through menus, toolbar, icons, and other graphics which are displayed on the GUI. For instance, in the field of computer-aided techniques, a number of systems and programs are offered on the market for the design of objects (or parts) or assemblies of objects, forming a product, such as the one provided by Dassault Systèmes under the trademark CATIA. These CAD systems allow a user to construct and manipulate complex three dimensional (3D) models of objects or assemblies of objects through the GUI.

Traditionally, operations are graphically performed by a cursor operated by the user. The cursor is displayed on the GUI of the device, and operated via a pointing device such as a mouse, a trackball, a graphic tablet, and the like. It is also possible to perform the operations via an input peripheral device such as physical buttons (e.g. push button) or a keyboard. More recently, touch-sensitive displays have been developed. They provide a new kind of interactions between the user and the device. The touch-sensitive display can detect the presence and the location of an interaction on the display area; for instance a contact of the user's finger on the display. The touch-sensitive display thus provides an input interface which replaces the traditional pointing device. Furthermore, it also provides an output interface.

A touch-sensitive display comprises a touch-sensitive surface which is able to detect any interaction of the user with this surface. Several types of touch-sensitive display technologies have been developed, including but not limited to, resistive, surface acoustic wave, infrared, and capacitive technologies. An interaction may be provided for instance via an object (e.g. a stylus) and/or an appendice (e.g. a finger of a hand of the user). Direct interactions with what is displayed are therefore possible.

In general, a device comprising a touch-sensitive display does not comprise anymore a pointing device and/or input peripheral device. However, this can prevent the user from performing some operations which are traditionally made with a pointing device and/or input peripheral device. For instance, some operations are performed with combinations of a set of alphanumeric keys of a keyboard which inputs information to the device, and such combinations are difficult to be reproduced with a touch-sensitive display.

U.S. Patent Application Publication No. 2009/0079700 A1 describes a one-touch rotation method for use within a graphical user interface. The one-touch rotation method allows a user to rotate, and sometimes move, a virtual object within a virtual workspace. Rotation of the virtual object can be achieved using a one-touch user input, such as a one-finger gesture. The one-touch rotation method includes recognizing and tracking a one-touch user input, and rotating the virtual object responsive to the tracked movement of the one-touch user input.

U.S. Patent Application Publication No. 2009/0184939 A1 describes a method for manipulating position, size and/or orientation of one or more graphical objects displayed on a touch-sensitive screen by directly interacting with the touch-sensitive screen using two or more user interactions. The relative location of the user interactions with respect to the graphical object being manipulated is maintained throughout the manipulation. The manipulation does not require analyzing trajectories and/or characterizing a movement path of the user interactions and thereby the manipulation can be performed at relatively low processing costs.

U.S. Patent Application Publication No. 2009/0153492 A1 describes a touch-sensitive display surface configured to display a geographic map and receive a gesture input generated by a user on the touch-sensitive display surface while the geographic map is displayed, the gesture input defining a selected geographic area on the geographic map. A finger-pinch made with the thumb and the index finger of a user produces a finger-pinch drawn boundary box gesture input that includes a rectangular shaped geographic boundary in a space between the thumb and the index finger that defines a selected geographic area.

The copy and paste command (also referred to as duplication command) is a very common function. It may be for example performed with the key-combinations Ctrl+C and Ctrl+V of the keyboard. Nevertheless, such key-combinations are not feasible on a touch-sensitive display or at least difficult to achieve. In order to bypass the above mentioned limitation, graphical copy/paste commands have been developed.

A first method consists in performing the copy/paste command by selecting with a pointing device the object to copy, then performing an action (e.g. right click with the right button of a mouse) on the object the user wants to copy and selecting the 'Copy' menu which appeared consecutively to the right click. Next, the user performs another action (e.g. a right click) at the location he/she wants to copy the object, and selects the 'Paste' menu (e.g. a left click). However, this method requires a pointing device with at least two buttons which is not always available on a touch-sensitive device.

U.S. Patent Application Publication No. 2009/0228842 A1 describes a copy Tool which allows the user to copy selected items by a distance and direction defined by two picked points on a window. After the user selects the copy Tool, the user can enter two points defining the distance and direction corresponding to the position of the copied item. When performing a copy command, the first selected point acts as the base reference point for copying the objects, while the second selected point defines the distance and direction for the copied items.

Another known method consists in performing a double tap on the object to select, then pressing and holding the finger to make a selection. Then the user selects the menu 'Copy' which appeared nearby the selected object thanks to the former gestures. Next, the user taps twice on the position he/she wants to copy. Finally, the user clicks on the menu 'Paste' which appeared nearby the selected position.

This method suffers the drawback that a copy Tool is selected, which may be a cumbersome task and time consuming when the user needs to make several copy/paste operations. For that reason, methods based on gestures have been proposed.

A known method consists in selecting the object to copy, and then to do a copy gesture on the selection. For instance, the gesture may be tapping concomitantly the thumb and the middle finger on the touch-sensitive surface. The paste gesture is carried out on the place where the user wants to paste the object.

These various methods for performing a copy/paste operation suffer several drawbacks. For instance, the achievement of these methods is time consuming. For instance, the menu 'Copy' needs to be called in order to trigger the copy/paste function, which involves performing a specific gesture for calling the menu. Moreover, the gestures required to trigger the copy/paste are not natural and ergonomical for the user. In addition, it is pretty hard for the user to position the duplicated object at a precise position; notably, this is the consequence of the non ergonomical gestures.

Thus, according to the limitations of the existing solutions shortly discussed above, there is a need for an improved method for duplicating an object in a touch-sensitive display. Preferably, the method should improve the precision of the gesture, which should be intuitive for the user.

BRIEF SUMMARY OF THE INVENTION

The invention therefore provides a computer-implemented method for duplicating an object using a touch-sensitive display. The method comprises displaying a selected first object on the touch-sensitive display, detecting a first user interaction and a second user interaction on the selected first object, detecting a movement of the first user interaction outside the selected first object, displaying a second object which tracks the movement of the first user interaction on the touch-sensitive display, the second object being a duplication of the first object, and positioning the second object according to a last detected location of the first user interaction on the touch-sensitive display.

The method according to the invention may comprise one or more of the following features:
- after the step of detecting a movement of a first user interaction, the step of detecting the end of the second user interaction on the selected object;
- the first user interaction and the second user interaction are performed concomitantly or successively, independently of the order of their detection on the selected first object;
- the last detected location of the first user interaction is the location on which the end of the first user interaction on the touch-sensitive display is detected
- the step of displaying a selected first object and the step of positioning the second object are performed within a same window of a graphical user interface;
- at the step of displaying a second object, the rendering of the second object is modified in comparison with the rendering of the first object;
- the first user interaction and the second user interaction are performed by the contact on the touch-sensitive display by at least one of the followings or the combination of: a stylus; a finger.
- the first user interaction and the second user interaction are performed by the contact on the touch-sensitive display of a respective finger of two hands of the user. The invention further proposes a computer program, stored on a computer readable medium, for duplicating an object using a touch-sensitive display, comprising code means for causing a computer to take the steps of the method.

The invention still concerns an apparatus for duplicating an object using a touch-sensitive display, the apparatus comprising means for implementing the steps of the method.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

A system embodying the invention will now be described, by way of non-limiting example, and in reference to the accompanying drawings, where.

DETAILED DESCRIPTION OF THE EMBODIMENTS

The invention is directed to a computer-implemented method for duplicating an object using a touch-sensitive display. The method comprises displaying a selected first object on the touch-sensitive display. An object is a graphical component which may be partly or totally selected by the user. The term object includes, but is not limited to, an icon, a modeled object, a menu, and other graphics . . . . In the following description, the selected object may be an assembly (a product) of objects, a part (or element) of the object. Next, the method comprises detecting a first user interaction and a second user interaction on the selected first object. Then, a movement of the first user interaction is detected outside the selected first object. After that, a second object is displayed which tracks the movement of the first user interaction on the touch-sensitive display. The second object is a duplication of the first object. The duplication means that the second object is the same as the first object, that is, the second object is a copy of the selected object. Then, the second object is positioned according to a last detected location of the first user interaction on the touch-sensitive display. The duplicated object is therefore pasted at the last detected location. Advantageously, the duplication according to the invention involves user interactions which are natural for the user. For instance, the movement of the first user interaction detected outside the selected first object is in the continuity of the first user interaction. Thus, the duplication gesture is simple and smooth for the user, and it is not interfered by a supplementary interaction on the touch-sensitive display. Furthermore, user's view on the object(s) displayed in the GUI is improved because no menu interferes it. In addition, the user can see at any time the location of the duplicated object, and therefore, the precision of the duplication gesture is improved.

Figure 1:
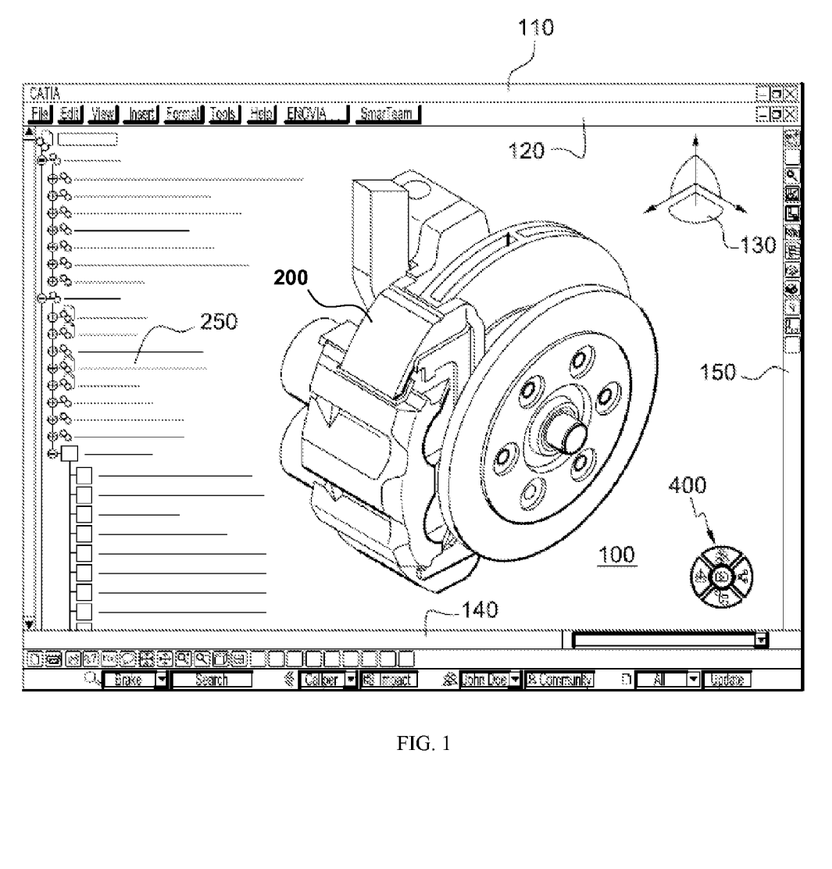
FIG. 1 is an example of a graphical user interface displayed on the touch-sensitive display.

In reference to FIG. 1, the exemplified graphical user interface (or GUI) 100 may be a typical CAD-like interface, having standard menu bars 110, 120, as well as bottom and side toolbars 140, 150. Such menu and toolbars contain a set of user-selectable icons, each icon being associated with one or more operations or functions, as known in the art. The user can thus interacts with the applications and programs through menus, toolbar, icons, and other graphics which are displayed on the GUI. One understands that the invention is not limited to CAD-like interfaces, and the invention applies to any kind of graphical interface.

Some of these icons are associated with software tools, adapted for editing and/or working on a modeled product 200 or parts of product 200 such as that displayed in the GUI 100. In the following description, "product", "part", "assembly" and the like may be referred to as "object". Note that the concept of "object" can in fact be generalized such that any graphical component which may be partly or totally selected by the user is an object.

The software tools may be grouped into workbenches. Each workbench comprises a subset of software tools. In particular, one of the workbenches is an edition workbench, suitable for editing geometrical features of the modeled product 200. In operation, a designer may for example pre-select a part of the object 200 and then initiate an operation (e.g. change the dimension, color, etc.) or edit geometrical constraints by selecting an appropriate icon. For example, typical CAD operations are the modeling of the punching or the folding of a 3D modeled object displayed on the screen.

The GUI may for example display data 250 related to the displayed product 200. In the example of FIG. 1, the data 250, displayed as a "feature tree", and their 3D representation 200 pertain to a brake assembly including brake caliper and disc. The GUI may further show various types of graphic tool 130, for example for facilitating 3D orientation of the object, for triggering a simulation of an operation of an edited product or render various attributes of the displayed product 200.

Figure 2:
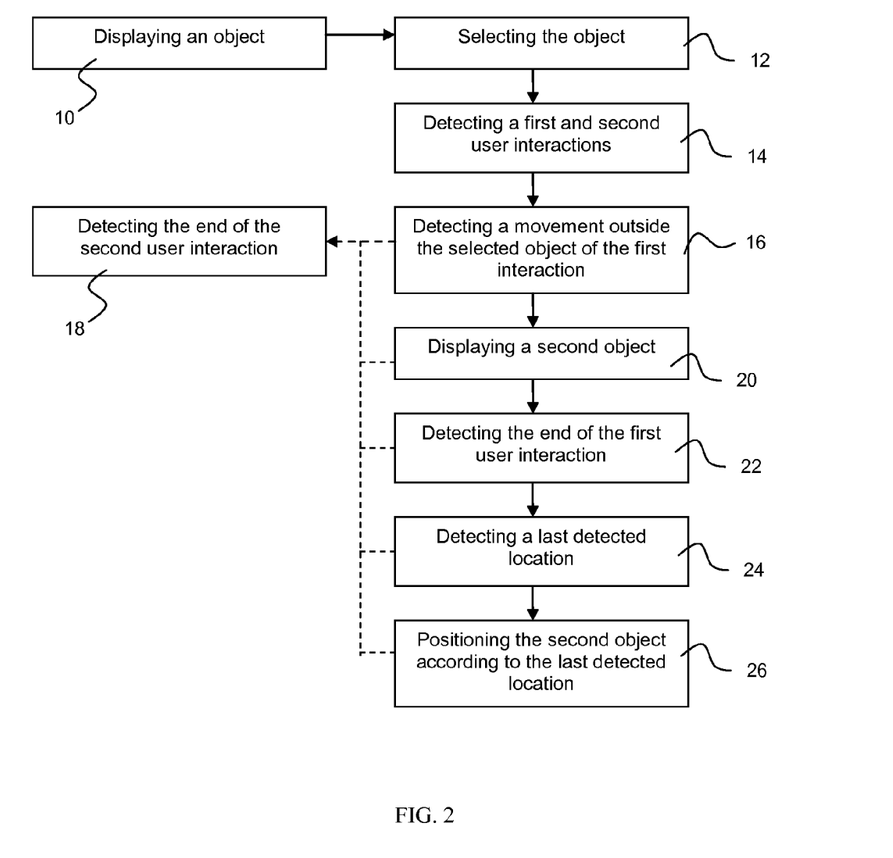
FIG. 2 is a flowchart depicting a duplication of an object according to the invention.

FIG. 2 shows a flowchart depicting an embodiment of the invention. The method starts at step 10: a first object is displayed. The display of the object is performed as known in the art. Typically, an object is a graphical component (also referred to as graphic) which may be partly or totally selected by the user. The term object includes, but is not limited to, an icon, a modeled object, a menu, and other graphics . . . . In the following description, the selected object may be an assembly (a product) of objects, a part (or element) of the object.

At step 12, the displayed first object is selected by a user. In other words, the user has identified the object on which he/she whishes to carry out operation(s). The selection of the first object may be made upon user action, or automatically by the system. The selection may be performed via, but is not limited to, a pointing device, a peripheral device, or directly via the touch-sensitive display (e.g. upon contact on the touch-sensitive display). Incidentally, the selected first object may be emphasized so that the user can easily see which the selected object is. For instance, the emphasizing of the selected first object may be carried out thanks to a highlight of the selected first object. A highlight consists in applying on the representation of the position an emissive and light colour. The emphasizing may also be performed by visual effects such blinking of the selected first object, thickening of the outline of the emphasized selected first object, or increasing a density of points forming the outline of the emphasized selected first object. By the way, any means which allows the designer to distinguish the selected first object among the others may be used.

At this stage, the selected first object (12) is displayed (10) on the touch-sensitive display. In practice, the selected first object is the object to duplicate.

At step 14, two user interactions, respectively a first user interaction and a second user interaction are detected on the selected first object. A user interaction is an input provided by the user on the touch-sensitive display. The input generates a signal which is transmitted to the device by the touch-sensitive display. The device, e.g. personal computer, laptop, music player, cell phone, personal digital assistants, computes and performs functions which may be triggered according to the transmitted signal. The touch-sensitive display can detect any input or movement or breaking of the input applied on it.

In practice, the first and second user interactions may be performed by the contact on the touch-sensitive display of an object (e.g. a stylus) or an appendice (e.g. a finger of a hand of the user). Many objects or appendices are possible and within the scope of the invention.

Figure 3:
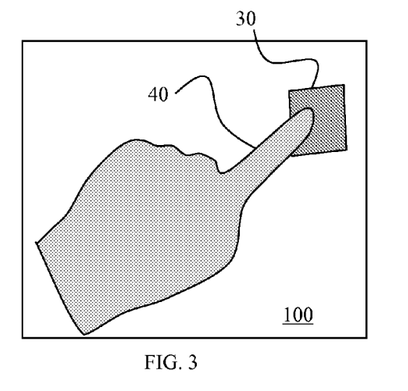
FIGS. 3-8 show a schematic view of a duplication of an object according to the invention.

Referring now to FIG. 3, a first selected object 30 is displayed on a GUI 100, as depicted in reference to FIG. 1. This object is a simple graphic: an icon. The finger 40 of a hand of the user is on the object 30: the finger 40 is in contact with the touch-sensitive display and a first user interaction is consequently detected on the object 30.

Figure 4:
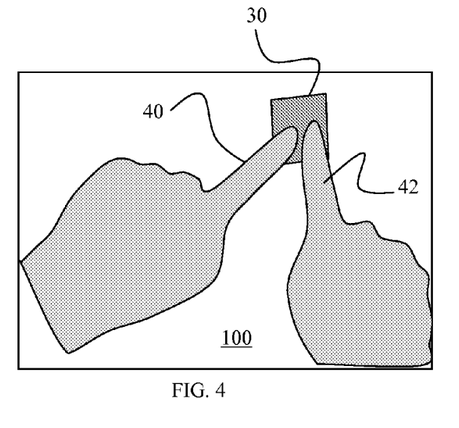

Referring now to FIG. 4, the finger 42 of the second hand of the user is on the object 30, and accordingly, a second user interaction is thus detected on the object 30.

In practice, the first user interaction and the second user interaction are performed by the contact on the touch-sensitive display of two fingers 40, 42, and each finger belongs to one respective hand of the user, as depicted on FIGS. 3-7. Conversely, the user may use only fingers which belong of one hand. Alternatively, two users may work together on the same GUI and collaborate, for instance during the design process of a modeled object; the first user interaction may be performed by one user and the second user interaction may be performed by the second user.

Incidentally, the first and second user interactions may be performed concomitantly or successively, independently of the order of their detection on the selected first object. The user is thus free to perform the first and second interactions according to his/her needs: advantageously, the method of duplication of the invention is intuitive for the user and its acquisition is thus easier.

Referring back to FIG. 2, at step 16, a movement of a user interaction outside the selected first object is detected. In practice, the detected movement is consecutive to a sliding of one of the two user interactions, and the detection is carried out for a movement outside an outline of the selected first object. The outline of the selected object is the silhouette of the projection of the selected object on the touch-sensitive display. Thus, the movement is not considered as detected while the sliding of one of the two user interactions is performed within the boundary of the selected first object, the boundary being materialized by the outline of the selected first object.

Incidentally, if the movement of the first user interaction is successively detected outside and inside the selected first object, then the movement may be not considered as detected. The user can therefore stop the duplication process before that the selected first object is duplicated. Advantageously, the user does not need to delete the duplication of an object which would be created by mistake. Alternatively, the movement successively detected outside and inside may be considered as detected, and the duplication process continues over the selected first object. Thus, the user may drop the duplication of the selected first object over the selected first object.

Next, at step 20, a second object, which is a duplication of the first object, is displayed on the touch-sensitive display. This second object tracks the movement of the first user interaction. That is, the second object follows locations of the first user interaction while moving on the touch-sensitive display. A location is a position, on the touch-sensitive display, where the input causing the user interaction is performed. In general, the touch-sensitive display is a two-dimensional (2D) interface between the user and a space in which the selected first object is located. The space may be 2D or 3D space. The input causing the user interaction is thus performed on a 2D interface toward 2D or 3D space. In the 2D space, the location of the first user interaction may be for instance determined according to a system of coordinates on the touch-sensitive display. In the 3D space, a 3D location of the first user interaction in the 3D space may be computed. The computing of this 3D location in the 3D space may be achieved for instance by a technique of picking as known in the art; for instance ray tracing.

Figure 5:
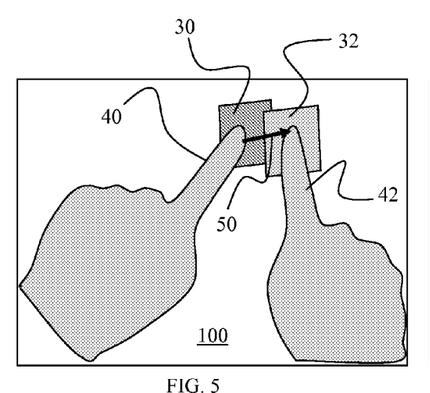

Referring to FIG. 5, the finger 42 has moved outside the object 30: the boundary of the first object 30 has been crossed by the finger 42. Therefore, a movement of the finger 42 is detected, and as a result, a second object 32 is displayed. For the sake of clarity of the figure, the second object 32 is not represented with the same color as the object 30. The user interaction created by the finger 42 performs a continuous contact with touch-sensitive display, even during the sliding of the finger which is represented by the arrow 50. Once the finger 42 has left the outline of the first object 30, a second object 32 which is the duplication of the first one 30, is displayed.

Figure 6:
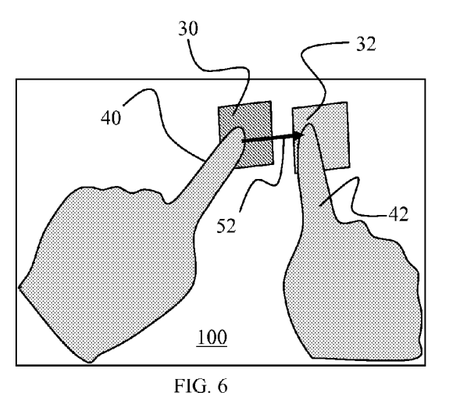

Referring now to FIG. 6, the movement 52 of the finger 42 goes on and the second object 32 still follows the movement 52 of the finger 42. The second object 32 is somehow anchored to the locations of the finger 42 on the touch-sensitive display. Thus, one understands another advantage of the invention: the user has a visual feedback of the precise location of the duplicated object of on the touch-sensitive display. The interactivity between the user and the device is thus greatly improved.

One can notice that the detected movement may be caused by the movement of the first user interaction or the second user interaction: indeed, as previously mentioned, the first and second user interactions are independent of the order of their detection on the selected first object. For instance, in FIGS. 3-7, the first user interaction is caused by the finger 40, the second user interaction and the detected movement by the finger 42, independently of the fact that the first user interaction is caused by the finger 40. Advantageously, the user can select which one of the first and second user interactions cause the detected movement. As a result, the method according to the invention may be performed whatever the location of the selected first object on the touch-sensitive is. For instance, in FIG. 5, if the selected first object 30 would be located at the left border of the touch-sensitive, then the movement outside the selected first object could be performed by the finger 42 of the right hand of the user. On the contrary, the movement outside the selected first object could be performed by the finger 40 of the left hand of the user if the selected first object 30 would be located at the right border of the touch-sensitive display.

The detection of the end of the second user interaction may be done at each step following the detection of the movement of the user interaction outside the selected first object. Preferably, it is detected after the detection of the movement of the user interaction outside the selected first object, as shown on FIG. 2 at step 18. In practice, the end of the second user interaction is detected once the user removes from the touch-sensitive display the object or the appendice which causes the second contact on the selected first object. Indeed, the process of duplication of the second object has been initiated, that is, the device in relation with the touch-sensitive display is aware that the first object is going to be duplicated. Hence, the second user interaction is no more required. This is advantageous compared to the previously known solutions because it is possible to duplicate an object in a same window of the GUI: indeed, the detected movement of the first user interaction is known by the device as being related to the duplication of the first selected object, and not for instance to a simple displacement of the object in the window. A window is a visual area containing some kind of user interface and wherein the output of and input of applications may be displayed, e.g. icons. As a result of steps 14 and 16, the device is aware that the first object is going to be duplicated, and the selected first object is therefore not moved. Gestures of steps 14 and 16 thus initiate the duplication of the selected first object.

Another advantage of these gestures is that the user has the possibility to provide a new user interaction while the duplicated second object tracks the movement of the first user interaction. For instance, referring back to FIGS. 5 and 6, the user may release the user interaction made by the finger 40 while the sliding 50, 52 of the finger 42 continues. The user's first hand 40 is therefore free for carrying out another operation while duplicating the first object, e.g. the user may open a window wherein he/she whishes to lay down the second object.

The rendering of the second object may be modified in comparison with the rendering of the first object during the display of the second object. Typically, the rendering is amended in order to reduce of the consumption of computational resources of the device for displaying the duplicated object. For instance, the level of detail of the second object may be reduced, or only the outline of the second object may be displayed.

At steps 22 and 24, the end of the first user interaction is detected together with its last location. The detected last location is the location at which the end of the first user interaction on the touch-sensitive display is detected. As mentioned above, the location of the first user interaction is the position, on the touch-sensitive display, where the input causing the user interaction is performed.

Finally, at step 26, the second object is positioned according to the last detected location of the first user interaction on the touch-sensitive display. This positioning of the second object ends the method of the invention: the object is duplicated at the position selected by the user. In other words, the copy/paste of the first object has been carried out.

Figure 7:
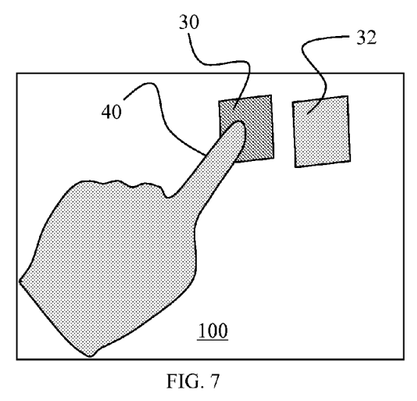

Referring now to FIG. 7, the user has removed the finger 42 from the touch-sensitive display. As a result, the second object 32 is positioned at the last detected position of the finger 42 which is depicted on FIG. 6. At this step, the method for duplicating an object ends.

Figure 8:
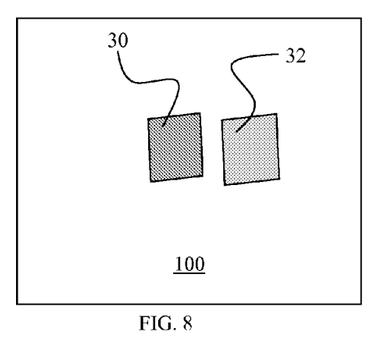

Finally, the user may remove the finger 40 from the touch-sensitive display if it was not previously performed. On FIG. 8, the two objects 30 and 32 are displayed on the GUI.

It is to be understood that the foregoing method can be applied to any object in any configuration capable, or any device used, to display an object. The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language or in assembly or machine language if desired; and in any case, the language may be a compiled or interpreted language.

Figure 9:
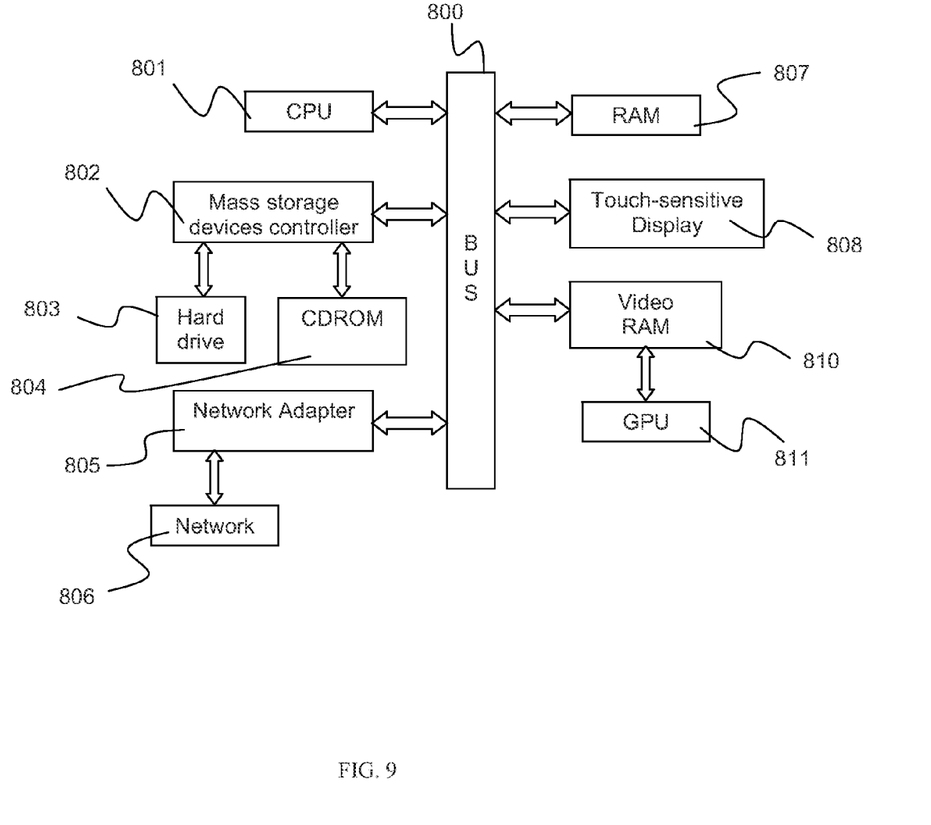
FIG. 9 is a schematic view of a client device adapted for carrying out the invention.

FIG. 9 shows a client device adapted for carrying out the invention, e.g. a computer system. The client device comprises a central processing unit (CPU) 801 connected to an internal communication BUS 800, a random access memory (RAM) 807 also connected to the BUS. The client device is further provided with a graphical processing unit (GPU) 811 which is associated with a video random access memory 810 connected to the BUS. Video RAM 810 is also known in the art as frame buffer. A mass storage device controller 802 manages accesses to a mass memory device, such as hard drive 803. Mass memory devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks 804. Any of the foregoing may be supplemented by, or incorporated in, specially designed ASICs (application-specific integrated circuits). A network adapter 805 manages accesses to a network 806. A touch-sensitive display 808 is used in the client computer to permit the user to interact at any desired location on the display 808. In addition, the touch-sensitive display allows the user to select various commands, and input control signals. The touch-sensitive display may generate signal for input control signals to system.

The preferred embodiment of the present invention has been described. It will be understood that various modifications may be made without departing from the spirit and scope of the invention. Therefore, other implementations are within the scope of the following claims. For instance, the method of the invention may be applied with virtual reality technologies which allow a user to interact with a computer-simulated environment through the use multimodal devices such as a wired glove. Thus, the duplication according to the invention may be performed on the virtual objects displayed to the user.

The invention claimed is:

1. A computer-implemented method for duplicating an object using a touch-sensitive display, the method comprising:
   displaying a selected first object on the touch-sensitive display, wherein the first object corresponds to an assembly of three dimensional (3D) modeled objects or a part of a 3D modeled object;
   detecting a first user interaction and a second user interaction on the selected first object, wherein the first user interaction and the second user interaction each have a respective beginning and end and each are performed by as few as one contact on the touch-sensitive display;
   detecting a movement of sliding of the first user interaction outside an outline of the selected first object, such that said detecting begins when the first user interaction is outside the outline;
   after detecting the movement of sliding of the first user interaction outside the outline of the selected first object, detecting a release of the second user interaction on the selected first object;
   displaying a second object, after the first user interaction is outside the outline, which tracks the movement of sliding of the first user interaction on the touch-sensitive display, the second object being a duplication of the first object; and
   after detecting the release of the second user interaction, positioning the second object according to a last detected location of the first user interaction on the touch-sensitive display.

2. The method of claim 1, further comprising, after the step of detecting a movement of a first user interaction, the step of:
   detecting the end of the second user interaction on the selected object.

3. The method of claim 1, wherein the first user interaction and the second user interaction are performed concomitantly or successively, independently of the order of their detection on the selected first object.

4. The method of claim 1, wherein the last detected location of the first user interaction is the location on which the end of the first user interaction on the touch-sensitive display is detected.

5. The method of claim 1, wherein the step of displaying a selected first object and the step of positioning the second object are performed within a same window of a graphical user interface.

6. The method of claim 1, wherein, at the step of displaying a second object, the rendering of the second object is modified in comparison with the rendering of the first object.

7. The method of claim 1, wherein the first user interaction and the second user interaction are performed by the contact on the touch-sensitive display by at least one of the following or the combination of:
   a stylus;
   a finger.

8. The method of claim 1, wherein the first user interaction and the second user interaction are performed by the contact on the touch-sensitive display of a respective finger of two hands of the user.

9. A non-transitory computer program product, for duplicating an object using a touch-sensitive display, stored on a computer readable medium comprising code means for causing a computer to take the steps of:
   displaying a selected first object on the touch-sensitive display, wherein the first object corresponds to an assembly of three dimensional (3D) modeled objects or a part of a 3D modeled object;
   detecting a first user interaction and a second user interaction on the selected first object, wherein the first user interaction and the second user interaction each have a respective beginning and end and each are performed by as few as one contact on the touch-sensitive display;
   detecting a movement of sliding of the first user interaction outside an outline of the selected first object, such that said detecting begins when the first user interaction is outside the outline;

after detecting the movement of sliding of the first user interaction outside the outline of the selected first object, detecting a release of the second user interaction on the selected first object;

displaying a second object, after the first user interaction is outside the outline, which tracks the movement of sliding of the first user interaction on the touch-sensitive display, the second object being a duplication of the first object; and after detecting the release of the second user interaction, positioning the second object according to a last detected location of the first user interaction on the touch-sensitive display.

10. An apparatus for duplicating an object using a touch-sensitive display, the apparatus comprising means for:

displaying a selected first object on the touch-sensitive display, wherein the first object corresponds to an assembly of three dimensional (3D) modeled objects or a part of a 3D modeled object;

detecting a first user interaction and a second user interaction on the selected first object, wherein the first user interaction and the second user interaction each have a respective beginning and end and each are performed by as few as one contact on the touch-sensitive display;

detecting a movement of sliding of the first user interaction outside an outline of the selected first object, such that said detecting begins when the first user interaction is outside the outline;

after detecting the movement of sliding of the first user interaction outside the outline of the selected first object, detecting a release of the second user interaction on the selected first object;

displaying a second object, after the first user interaction is outside the outline, which tracks the movement of sliding of the first user interaction on the touch-sensitive display, the second object being a duplication of the first object; and after detecting the release of the second user interaction, positioning the second object according to a last detected location of the first user interaction on the touch-sensitive display.

\* \* \* \* \*